US011112575B2

(12) United States Patent
Huang

(10) Patent No.: US 11,112,575 B2
(45) Date of Patent: Sep. 7, 2021

(54) IMAGING DEVICE WITH FOCUSING RING ADJUSTING MECHANISM

(71) Applicant: QISDA CORPORATION, Taoyuan (TW)

(72) Inventor: Hung-Yen Huang, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 200 days.

(21) Appl. No.: 16/411,120

(22) Filed: May 13, 2019

(65) Prior Publication Data

US 2020/0174216 A1 Jun. 4, 2020

(30) Foreign Application Priority Data

Nov. 30, 2018 (CN) .......................... 201811455206.8

(51) Int. Cl.
*G02B 7/02* (2021.01)
*G02B 7/04* (2021.01)
*G03B 21/14* (2006.01)

(52) U.S. Cl.
CPC .............. *G02B 7/023* (2013.01); *G02B 7/04* (2013.01); *G03B 21/142* (2013.01)

(58) Field of Classification Search
CPC ........ G02B 7/04; G02B 7/023; G03B 21/142; G03B 21/154
USPC .......................... 359/822, 823, 825; 353/101
See application file for complete search history.

(56) References Cited

U.S. PATENT DOCUMENTS

| | | | | |
|---|---|---|---|---|
| 7,246,908 B2* | 7/2007 | Salvatori | .............. | H04N 9/3141 348/E5.143 |
| 7,354,161 B2* | 4/2008 | Kuroda | .................... | G03B 5/00 348/E5.143 |
| 7,420,747 B2* | 9/2008 | Yoshikawa | ............ | G02B 7/023 359/699 |
| 7,658,499 B2* | 2/2010 | Meng | .................... | G03B 21/142 353/101 |
| 7,744,227 B2* | 6/2010 | Shindo | ................. | G03B 21/142 353/101 |
| 8,333,477 B2* | 12/2012 | Kamiya | .................... | G03B 3/02 353/119 |
| 8,449,124 B2* | 5/2013 | Tseng | .................... | G03B 21/142 353/101 |
| 9,851,543 B2* | 12/2017 | Lee | ........................ | G03B 21/142 |
| 2006/0251412 A1* | 11/2006 | Liu | ........................... | G02B 7/10 396/72 |
| 2006/0256303 A1* | 11/2006 | Hamada | .................... | G03B 3/00 353/101 |
| 2007/0046906 A1* | 3/2007 | Ruan | .................... | G03B 21/142 353/101 |

(Continued)

FOREIGN PATENT DOCUMENTS

| | | |
|---|---|---|
| CN | 101027606 A | 8/2007 |
| CN | 201242648 Y | 5/2009 |
| TW | 200712735 A | 4/2007 |

*Primary Examiner* — Zachary W Wilkes

(57) ABSTRACT

An imaging device includes a casing, a lens and an adjusting mechanism. The lens is disposed in the casing. The lens includes a focus ring. The adjusting mechanism includes an adjusting module and a rod member. The adjusting module is movably disposed on the casing. The adjusting module includes a slot. The rod member is disposed on the focus ring and located in the slot. When the adjusting module moves with respect to the casing, a side wall of the slot drives the rod member to move, such that the rod member drives the focus ring to rotate.

14 Claims, 12 Drawing Sheets

(56) References Cited

U.S. PATENT DOCUMENTS

2010/0039626 A1* 2/2010 Wen .................... G03B 21/142
 353/101
2013/0044298 A1* 2/2013 Jung ........................ G03B 3/00
 353/101

* cited by examiner

IMAGING DEVICE WITH FOCUSING RING ADJUSTING MECHANISM

BACKGROUND OF THE INVENTION

1. Field of the Invention

The invention relates to an imaging device and, more particularly, to an imaging device allowing a user to adjust a focus ring of a lens conveniently.

2. Description of the Prior Art

Recently, projectors are getting more and more popular. With the capacity of video playing, projectors are applied not only for common office meetings, but also for various seminars or academic courses. In general, a projector may comprise various optical components including a lens, a light source, an optical engine module and so on, wherein the light source is configured to emit light beam and the light beam is processed by the optical engine module and then projected to form an image through the lens. Accordingly, the lens is an important optical component in the projector. Currently, in some projectors, a focus structure of a lens (e.g. ultra short throw lens) is located above the lens, such that a user may block a projected picture while operating the focus structure. Furthermore, the focus structure of the prior art uses a plurality of gears to transmit motion, such that the cost is high and much space is occupied.

SUMMARY OF THE INVENTION

An objective of the invention is to provide an imaging device allowing a user to adjust a focus ring of a lens conveniently, so as to solve the aforesaid problems.

According to an embodiment of the invention, an imaging device comprises a casing, a lens and an adjusting mechanism. The lens is disposed in the casing. The lens comprises a focus ring. The adjusting mechanism comprises an adjusting module and a rod member. The adjusting module is movably disposed on the casing. The adjusting module comprises a slot. The rod member is disposed on the focus ring and located in the slot. When the adjusting module moves with respect to the casing, a side wall of the slot drives the rod member to move, such that the rod member drives the focus ring to rotate.

As mentioned in the above, the invention utilizes the cooperation between the slot of the adjusting module and the rod member to adjust the focus ring of the lens. When a user operates the adjusting module to move with respect to the casing, the side wall of the slot drives the rod member to move, such that the rod member drives the focus ring to rotate. The operation of the adjusting mechanism of the invention is convenient and the structure thereof is simple.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
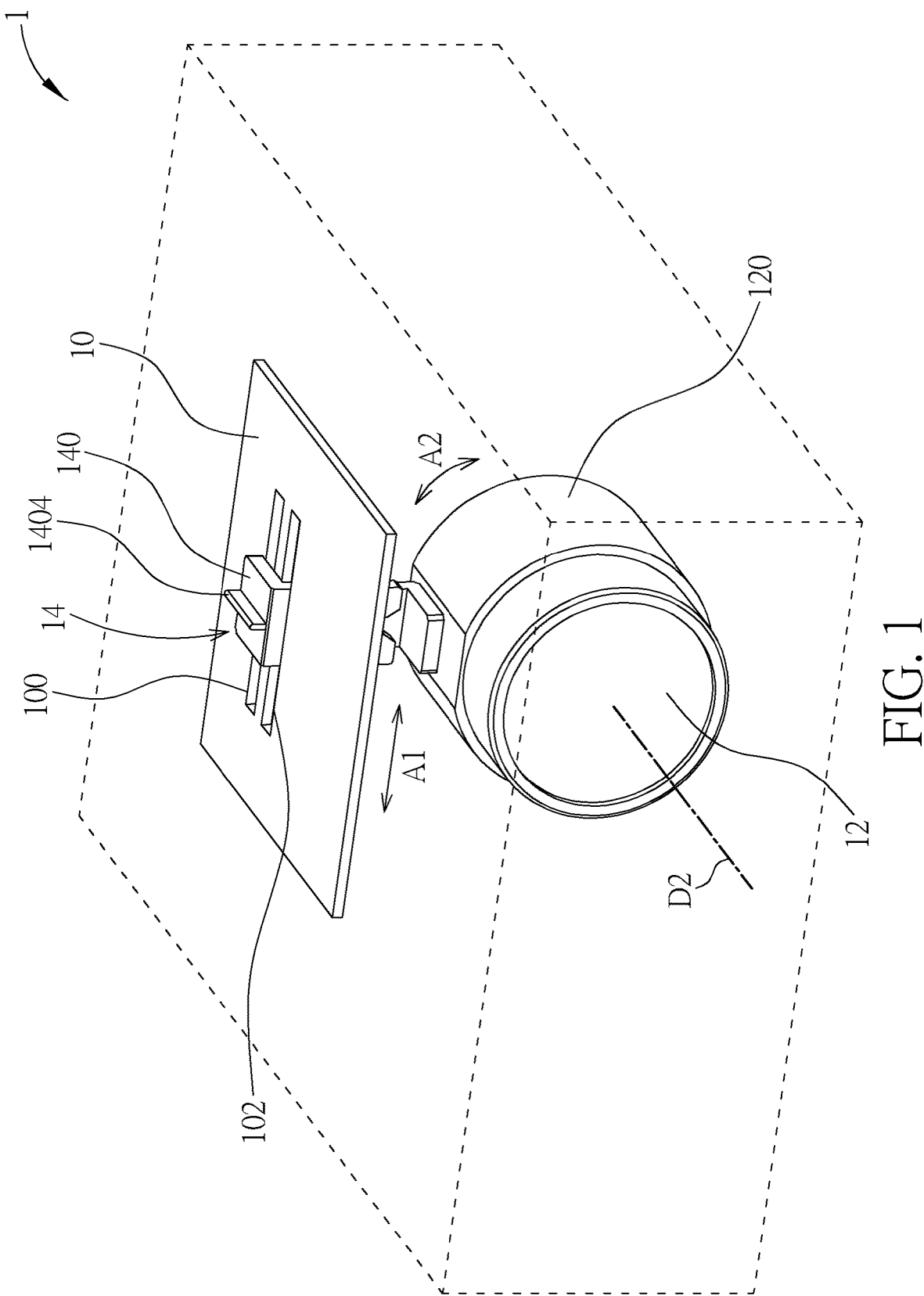
FIG. 1 is a perspective view illustrating an imaging device according to an embodiment of the invention.
Figure 2:
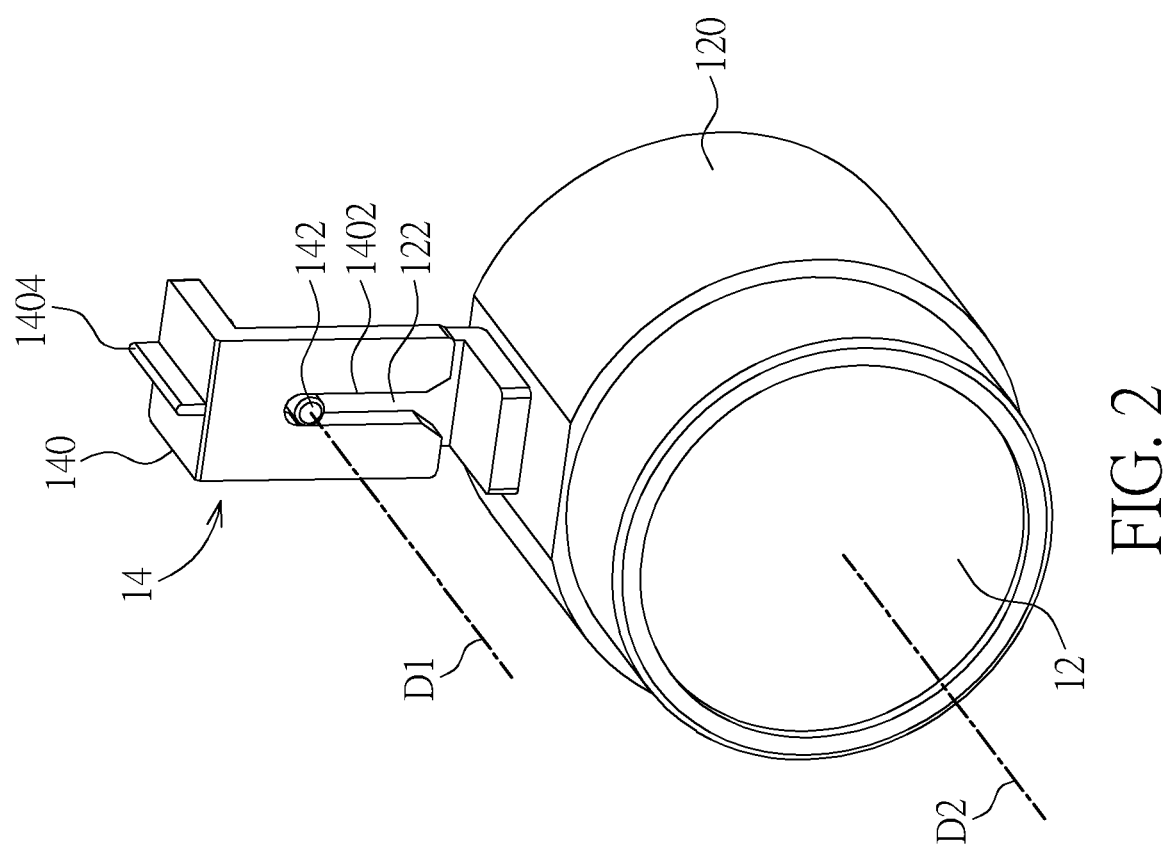
FIG. 2 is a perspective view illustrating the lens and the adjusting mechanism shown in FIG. 1.
Figure 3:
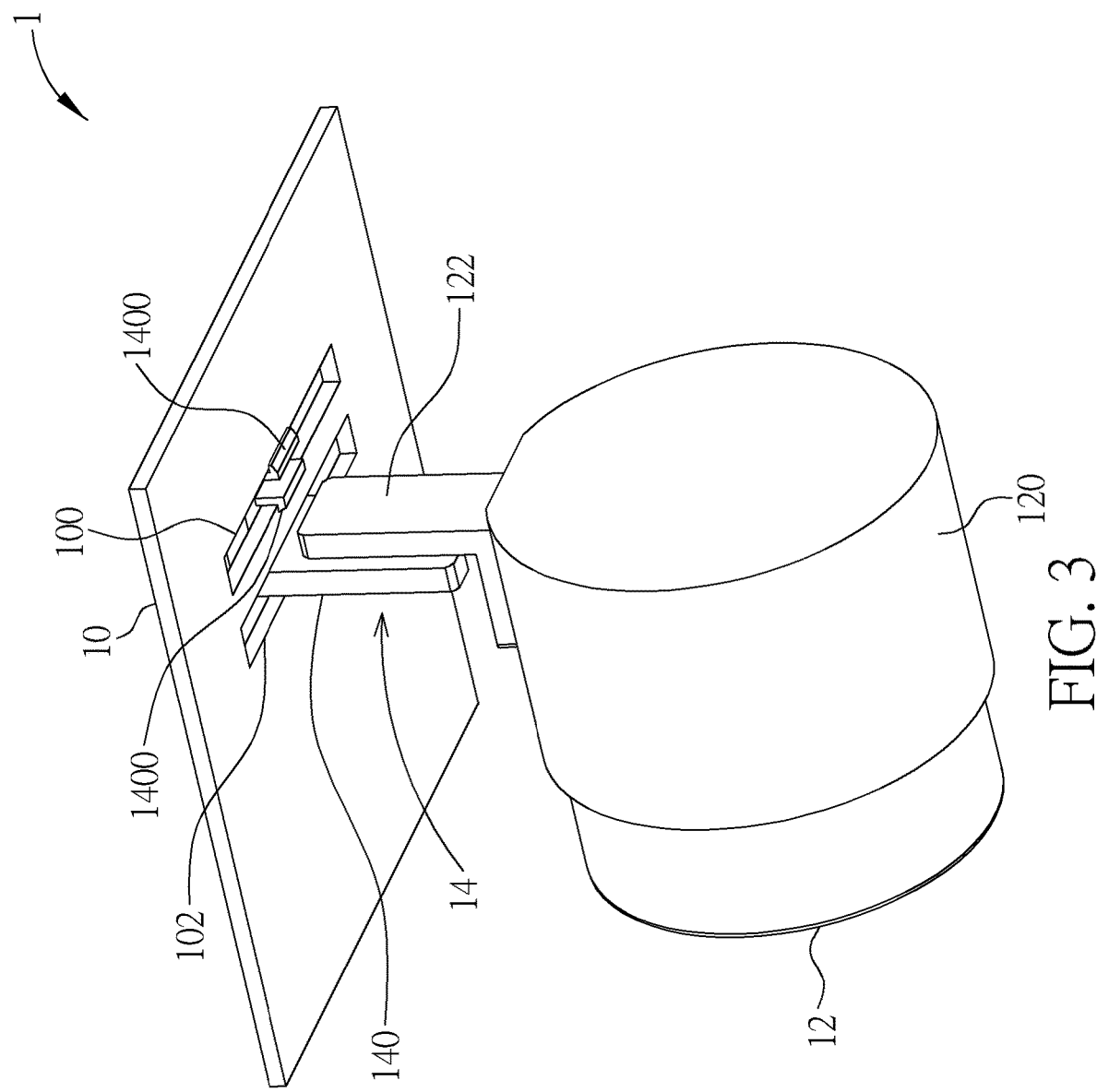
FIG. 3 is a perspective view illustrating the imaging device shown in FIG. 1 from another viewing angle.

Referring to FIGS. 1 to 3, FIG. 1 is a perspective view illustrating an imaging device 1 according to an embodiment of the invention, FIG. 2 is a perspective view illustrating the lens 12 and the adjusting mechanism 14 shown in FIG. 1, and FIG. 3 is a perspective view illustrating the imaging device 1 shown in FIG. 1 from another viewing angle. As shown in FIGS. 1 to 3, the imaging device 1 comprises a casing 10, a lens 12 and an adjusting mechanism 14. In this embodiment, the imaging device 1 may be, but not limited to, a projector. In another embodiment, the imaging device 1 may also be a camera or other electronic devices equipped with the lens 12. In this embodiment, the lens 12 may be an ultra short throw lens or other lenses. The lens 12 is disposed in the casing 10. The lens 12 comprises a focus ring 120 and the focus ring 120 comprises a protruding portion 122.

The adjusting mechanism 14 comprises an adjusting module 140 and a rod member 142. The adjusting module 140 is movably disposed on the casing 10. In this embodiment, the casing 10 comprises two sliding grooves 100, 102 and the adjusting module 140 comprises two engaging portions 1400. It should be noted that the number of the engaging portions 1400 may also be one or more than two according to practical applications. The engaging portions 1400 of the adjusting module 140 are inserted into the sliding groove 100 to engage with the casing 10, such that the adjusting module 140 is movably disposed on the casing 10. When the adjusting module 140 moves with respect to the casing 10 in a direction of the double-headed arrow A1, the engaging portions 1400 move within the sliding groove 100.

The adjusting module 140 comprises a slot 1402 and the slot 1402 is disposed in the sliding groove 102 of the casing 10. The rod member 142 is disposed on the focus ring 120 of the lens 12 and located in the slot 1402 of the adjusting module 140. In this embodiment, the rod member 142 may extend from the protruding portion 122 of the focus ring 120, such that an axial direction D1 of the rod member 142 is parallel to an optical axis D2 of the lens 12. Furthermore, the adjusting module 140 comprises an operating portion 1404 and the operating portion 1404 is exposed from the casing 10.

In this embodiment, a user may push the operating portion 1404 in the direction of the double-headed arrow A1 to move the adjusting module 140 with respect to the casing 10 in the direction of the double-headed arrow A1. When the adjusting module 140 moves with respect to the casing 10 in the direction of the double-headed arrow A1, a side wall of the slot 1402 drives the rod member 142 to move, such that the rod member 142 drives the focus ring 120 to rotate in a direction of the double-headed arrow A2, so as to adjust a focal length of the lens 12.

Figure 4:
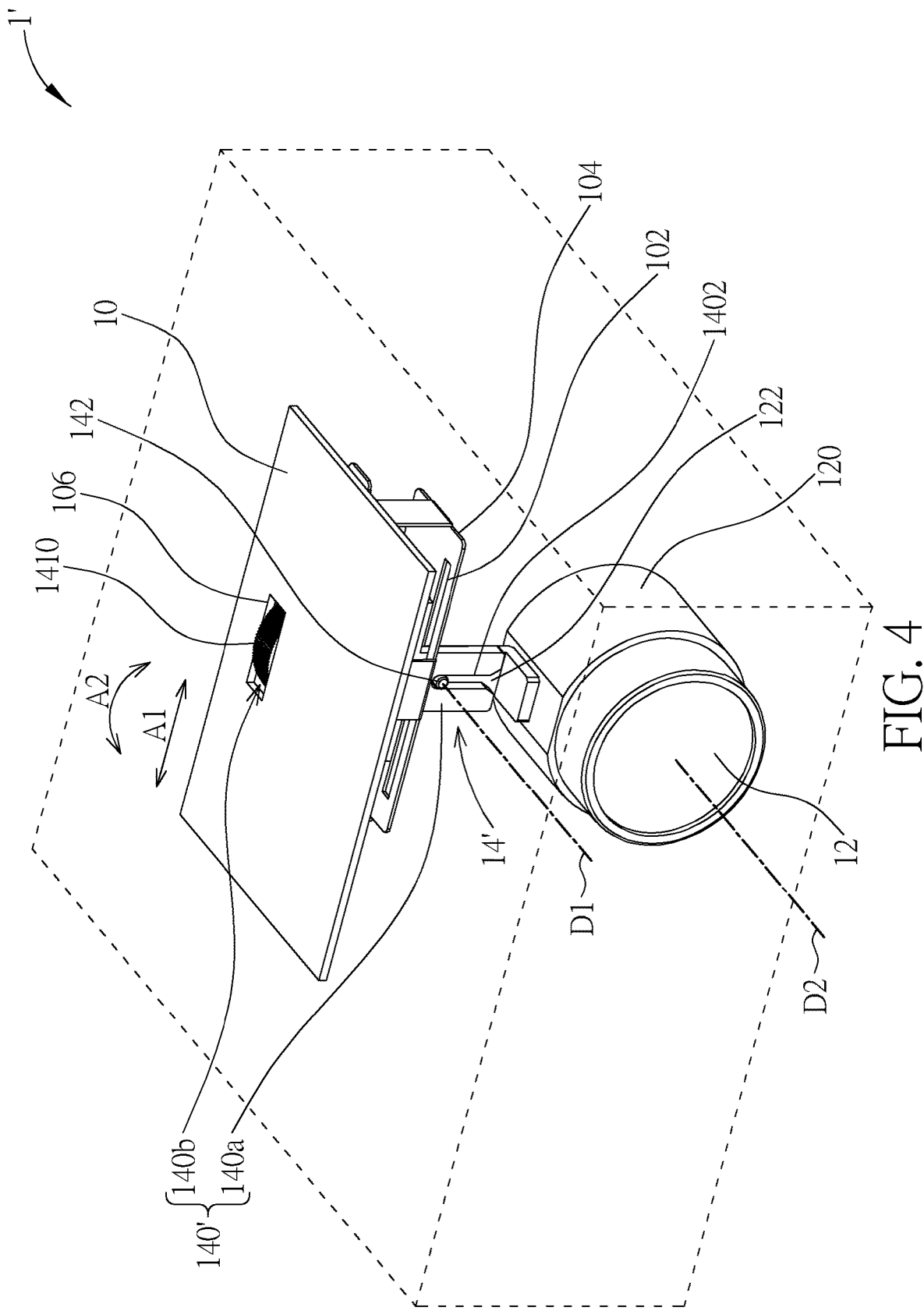
FIG. 4 is a perspective view illustrating an imaging device according to another embodiment of the invention.
Figure 5:
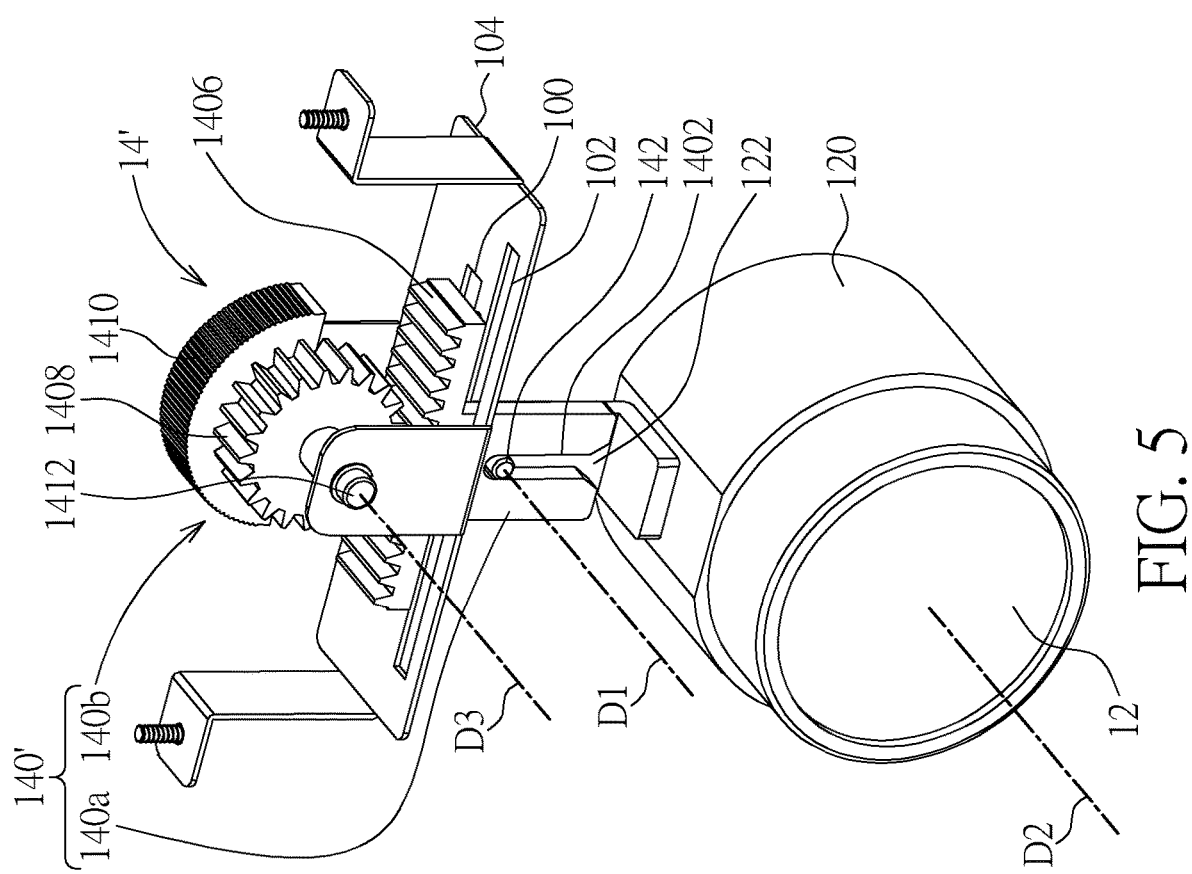
FIG. 5 is a perspective view illustrating the lens and the adjusting mechanism shown in FIG. 4.
Figure 6:
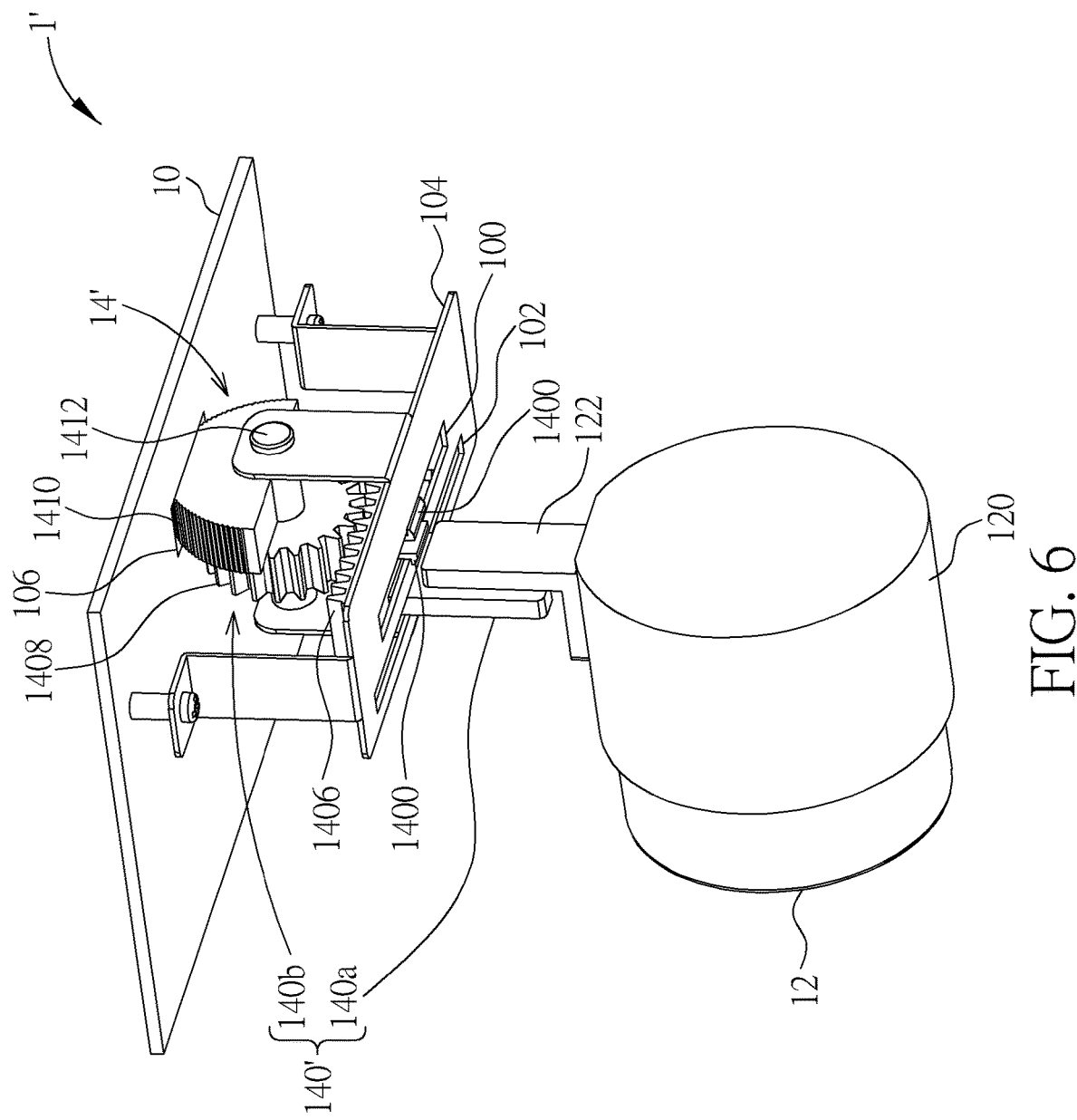
FIG. 6 is a perspective view illustrating the imaging device shown in FIG. 4 from another viewing angle.
Figure 7:
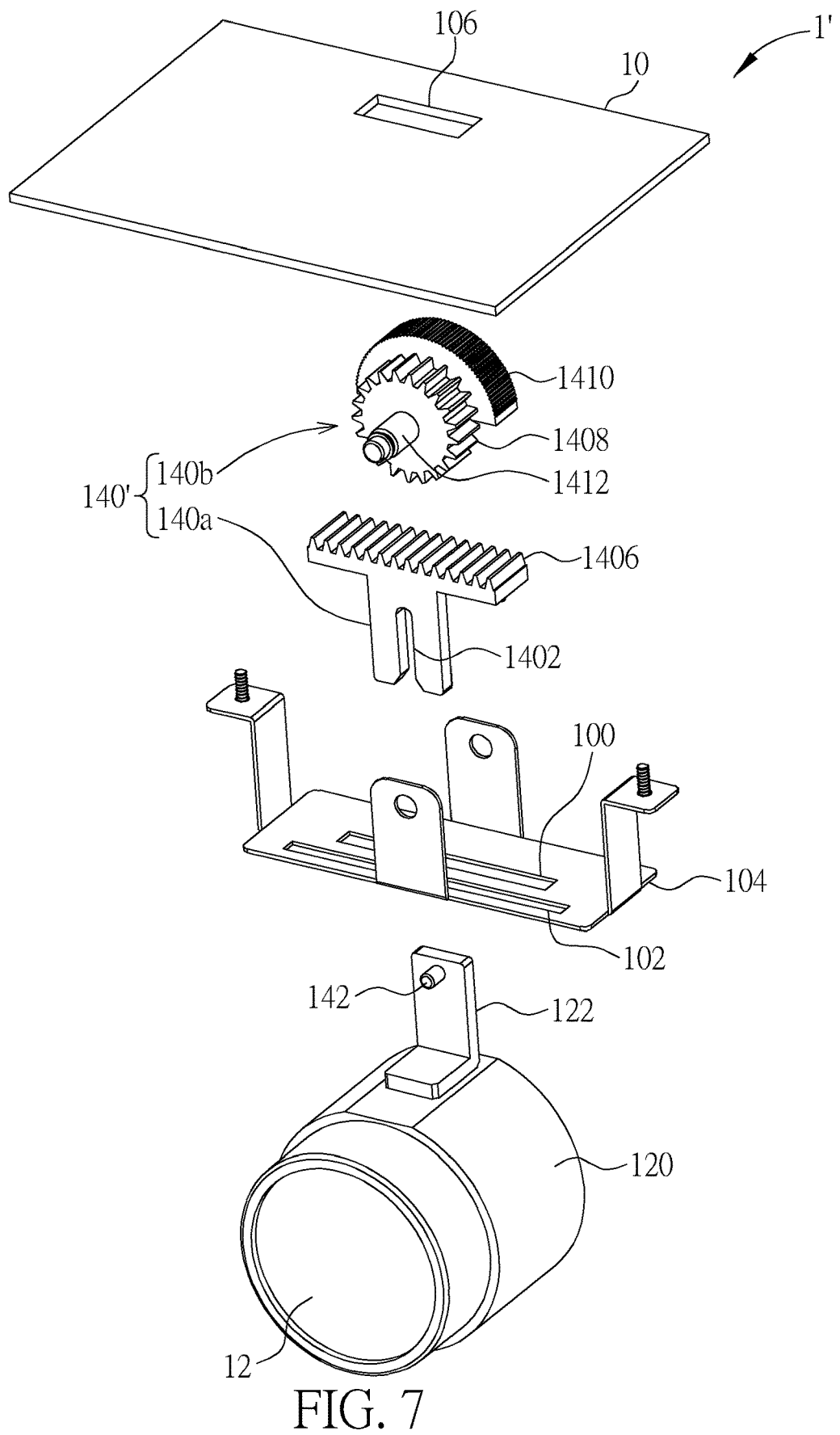
FIG. 7 is an exploded view illustrating the imaging device shown in FIG. 4.

Referring to FIGS. 4 to 7, FIG. 4 is a perspective view illustrating an imaging device 1' according to another embodiment of the invention, FIG. 5 is a perspective view illustrating the lens 12 and the adjusting mechanism 14' shown in FIG. 4, FIG. 6 is a perspective view illustrating the imaging device 1' shown in FIG. from another viewing angle, and FIG. 7 is an exploded view illustrating the imaging device 1' shown in FIG. 4.

The main difference between the imaging device 1' and the aforesaid imaging device 1 is that the adjusting module 140' of the adjusting mechanism 14' of the imaging device 1' comprises a first adjusting member 140a and a second adjusting member 140b. The first adjusting member 140a is movably disposed on the casing 10 and the second adjusting member 140b is rotatably disposed on the casing 10. In this embodiment, the casing 10 comprises a support frame 104 and the support frame 104 comprises the aforesaid two sliding grooves 100, 102. Furthermore, the first adjusting member 140a comprises the aforesaid two engaging portions 1400, the aforesaid slot 1402 and a rack portion 1406. Moreover, the second adjusting member 140b comprises a gear portion 1408, a rotating portion 1410 and a pivot 1412, wherein the gear portion 1408 is disposed on the rotating portion 1410.

The gear portion 1408 of the second adjusting member 140b meshes with the rack portion 1406 of the first adjusting member 140a. The second adjusting member 140b is pivotally connected to the support frame 104 of the casing 10 by the pivot 1412, such that the second adjusting member 140b is rotatable. The rotating portion 1410 of the second adjusting member 140b is exposed from a hole 106 of the casing 10. The engaging portions 1400 of the first adjusting member 140a are inserted into the sliding groove 100 to engage with the support frame 104, such that the first adjusting member 140a is movably disposed on the support frame 104. When the first adjusting member 104a moves with respect to the support frame 104 in the direction of the double-headed arrow A1, the engaging portions 1400 move within the sliding groove 100. Furthermore, the slot 1402 of the first adjusting member 140a is disposed in the sliding groove 102 of the support frame 104 and the rod member 142 is located in the slot 1402 of the first adjusting member 140a. In this embodiment, the axial direction D1 of the rod member 142 is still parallel to the optical axis D2 of the lens 12 and a rotating axis D3 of the second adjusting member 140b is also parallel to the optical axis D2 of the lens 12.

In this embodiment, a user may push the rotating portion 1410 of the second adjusting member 140b to rotate in the direction of the double-headed arrow A2. When the second adjusting member 140b rotates with respect to the casing 10 in the direction of the double-headed arrow A2, the gear portion 1408 of the second adjusting member 140b drives the rack portion 1406 of the first adjusting member 140a to move in the direction of the double-headed arrow A1, such that the first adjusting member 140a moves with respect to the casing 10 in the direction of the double-headed arrow A1. When the first adjusting member 140a moves with respect to the casing 10 in the direction of the double-headed arrow A1, the side wall of the slot 1402 drives the rod member 142 to move, such that the rod member 142 drives the focus ring 120 to rotate in the direction of the double-headed arrow A2, so as to adjust the focal length of the lens 12.

Figure 8:
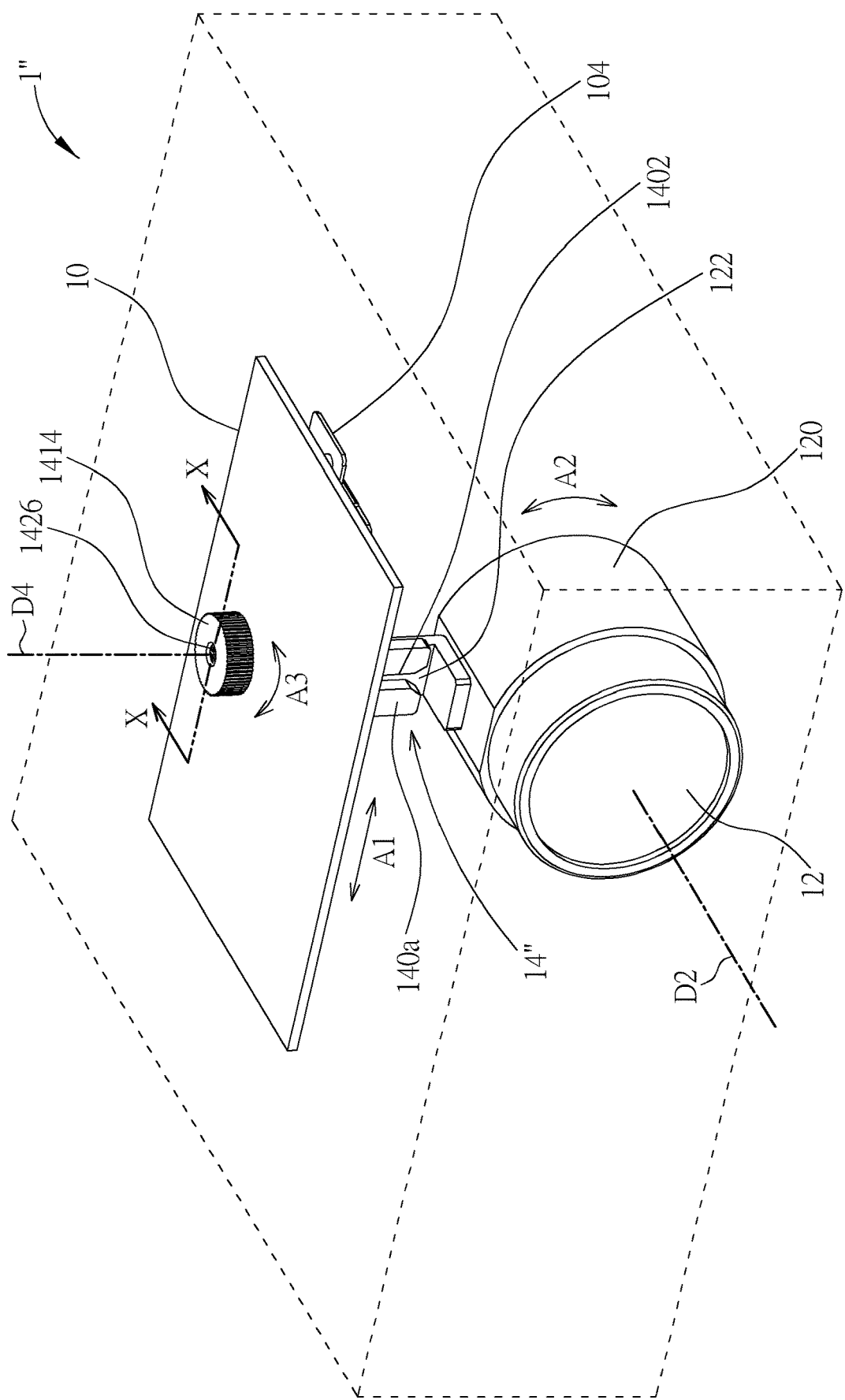
FIG. 8 is a perspective view illustrating an imaging device according to another embodiment of the invention.
Figure 9:
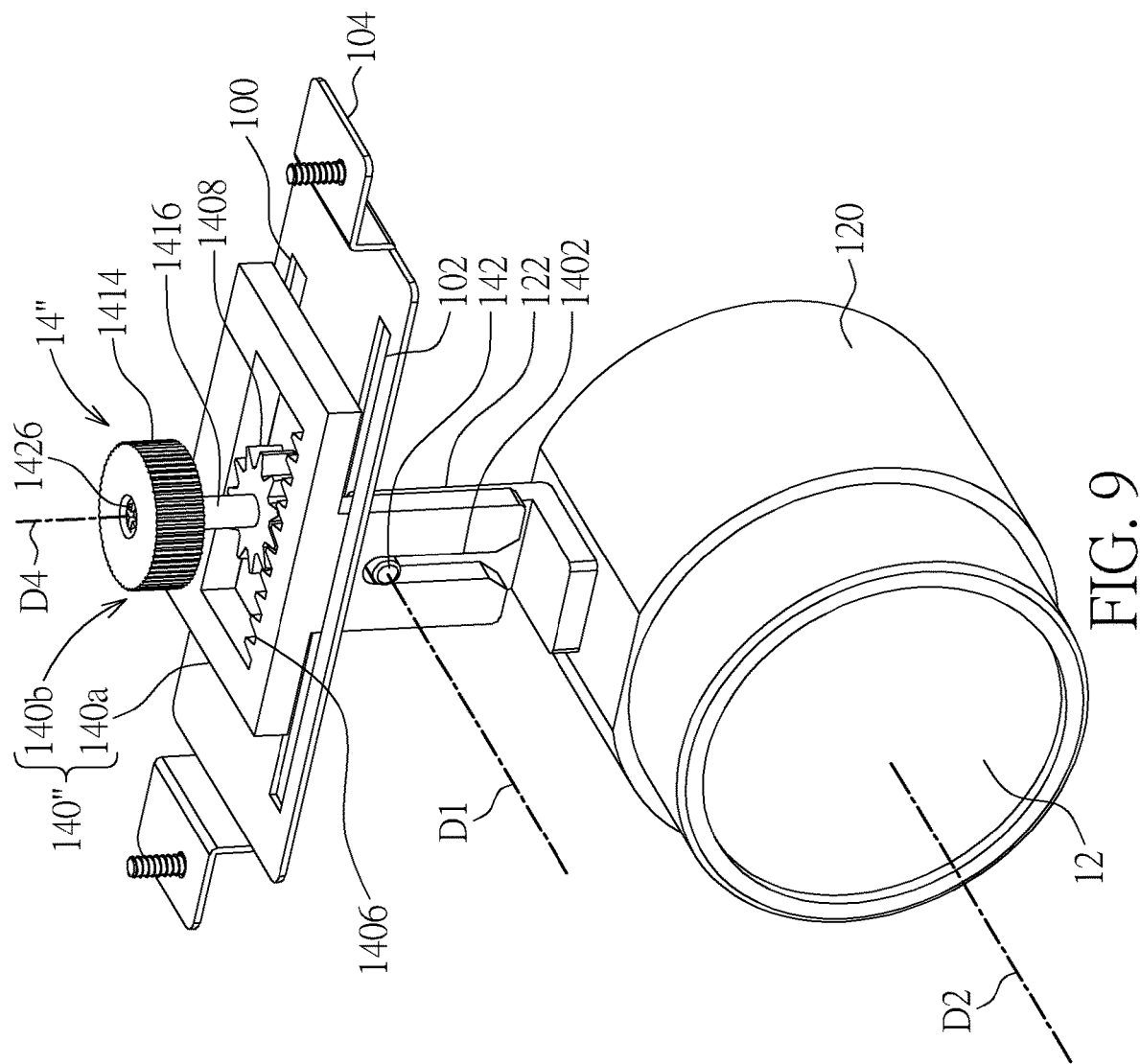
FIG. 9 is a perspective view illustrating the lens and the adjusting mechanism shown in FIG. 8.
Figure 10:
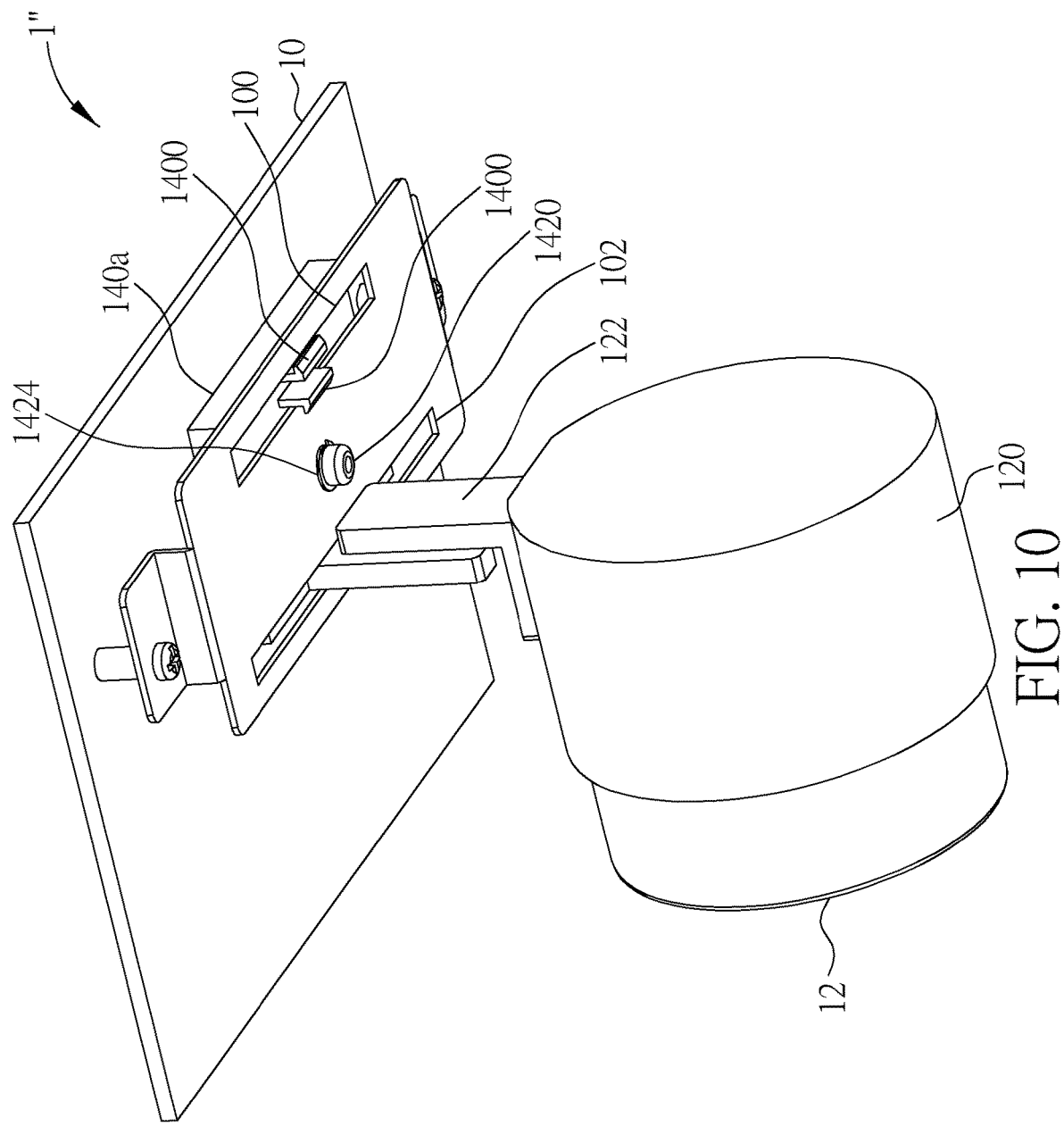
FIG. 10 is a perspective view illustrating the imaging device shown in FIG. 8 from another viewing angle.
Figure 11:
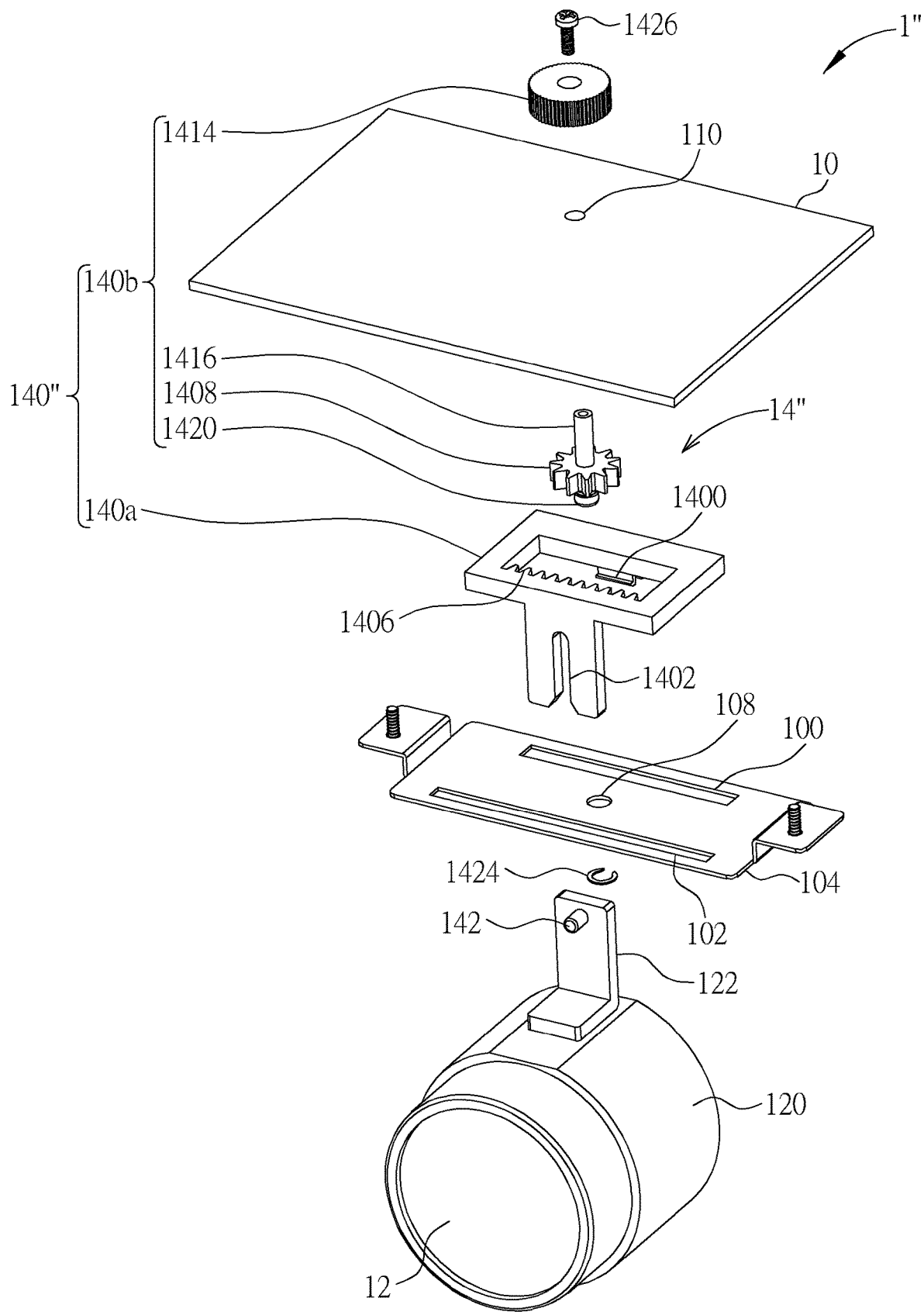
FIG. 11 is an exploded view illustrating the imaging device shown in FIG. 8.
Figure 12:
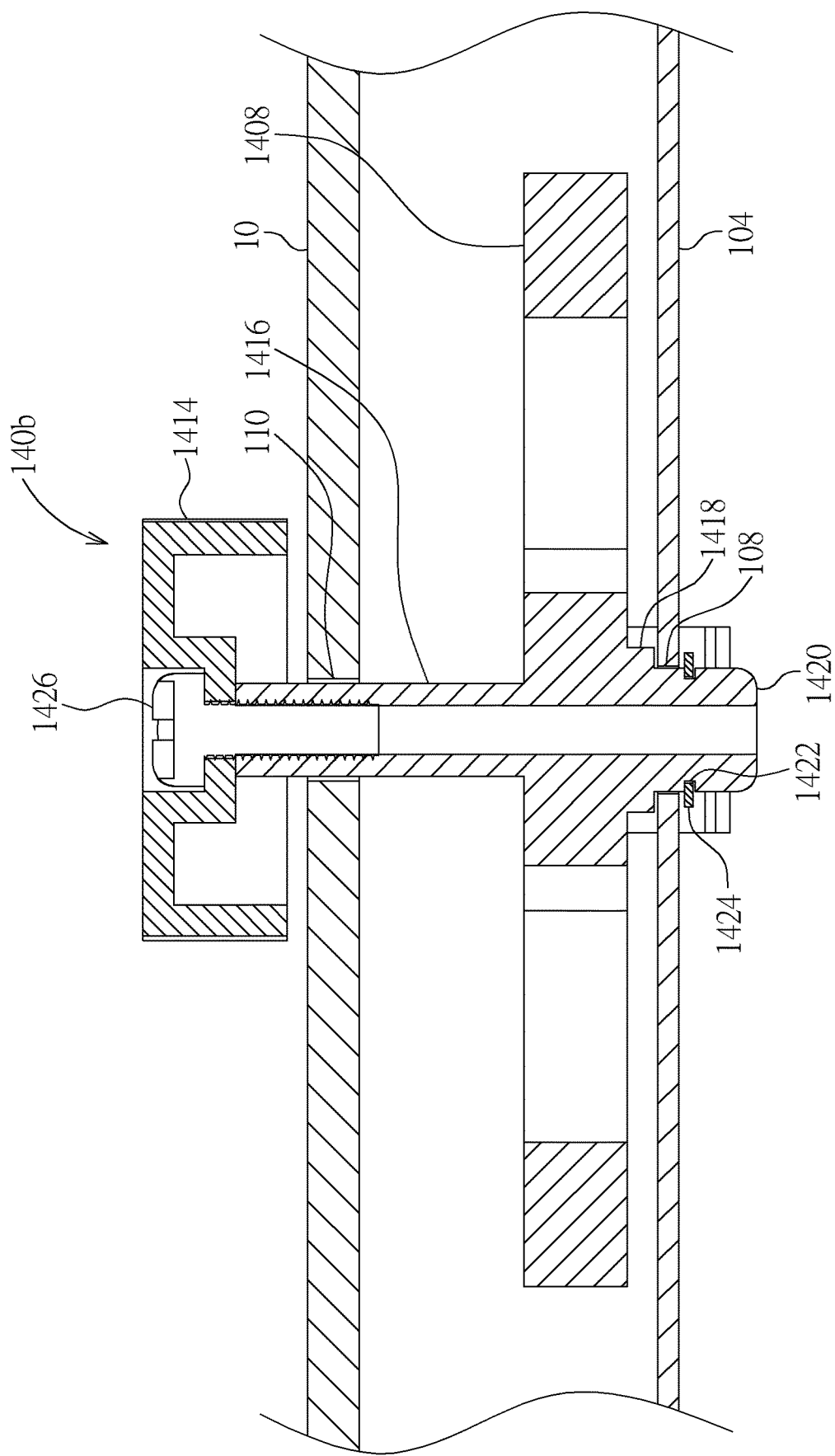
FIG. 12 is a sectional view illustrating the imaging device shown in FIG. 8 along line X-X.

Referring to FIGS. 8 to 12, FIG. 8 is a perspective view illustrating an imaging device 1" according to another embodiment of the invention, FIG. 9 is a perspective view illustrating the lens 12 and the adjusting mechanism 14" shown in FIG. 8, FIG. 10 is a perspective view illustrating the imaging device 1" shown in FIG. 8 from another viewing angle, FIG. 11 is an exploded view illustrating the imaging device 1" shown in FIG. 8, and FIG. 12 is a sectional view illustrating the imaging device 1" shown in FIG. 8 along line X-X.

The main difference between the imaging device 1" and the aforesaid imaging device 1 is that the adjusting module 140" of the adjusting mechanism 14' of the imaging device 1' comprises a first adjusting member 140a and a second adjusting member 140b. The first adjusting member 140a is movably disposed on the casing 10 and the second adjusting member 140b is rotatably disposed on the casing 10. In this embodiment, the casing 10 comprises a support frame 104 and the support frame 104 comprises the aforesaid two sliding grooves 100, 102. Furthermore, the first adjusting member 140a comprises the aforesaid two engaging portions 1400, the aforesaid slot 1402 and a rack portion 1406. Moreover, the second adjusting member 140b comprises a gear portion 1408, a head portion 1414, a neck portion 1416, a restraining portion 1418 and an end portion 1420, wherein the neck portion 1416 is located between the head portion 1414 and the gear portion 1408, the gear portion 1408 is located between the neck portion 1416 and the restraining portion 1418, and the restraining portion 1418 is located between the gear portion 1408 and the end portion 1420. In this embodiment, the gear portion 1408, the neck portion 1416, the restraining portion 1418 and the end portion 1420 are formed integrally, and the head portion 1414 is an independent component. As shown in FIG. 12, the end portion 1420 has an engaging recess 1422.

In this embodiment, the adjusting module 140" may further comprise a retaining member 1424 and a fixing member 1426. The retaining member 1424 may be, but not limited to, a C-shaped retainer or an E-shaped retainer, and the fixing member 1426 may be, but not limited to, a screw. To assemble the second adjusting member 140b to the casing 10 and the support frame 104, an operator may dispose the end portion 1420 in a hole 108 of the support frame 104 first and then engage the retaining member 1424 with the engaging recess 1422 of the end portion 1420. At this time, the support frame 104 is sandwiched in between the restraining portion 1418 and the retaining member 1424, as shown in FIG. 12. Then, the operator may insert the neck 1416 into a hole 110 of the casing 10 and then use the fixing member 1426 to fix the head portion 1414 to the neck portion 1416, as shown in FIG. 12. Accordingly, the second adjusting member 140b is rotatably disposed on the casing 10 and the support frame 104, and the head portion 1414 of the second adjusting member 140b is exposed from the casing 10.

Furthermore, the gear portion 1408 of the second adjusting member 140b meshes with the rack portion 1406 of the first adjusting member 140a. The engaging portions 1400 of the first adjusting member 140a are inserted into the sliding groove 100 to engage with the support frame 104, such that the first adjusting member 140a is movably disposed on the support frame 104. When the first adjusting member 140a moves with respect to the support frame 104 in the direction of the double-headed arrow A1, the engaging portions 1400 move within the sliding groove 100. Moreover, the slot 1402 of the first adjusting member 140a is disposed in the sliding groove 102 of the support frame 104 and the rod member 142 is located in the slot 1402 of the first adjusting member 140a. In this embodiment, the axial direction D1 of the rod member 142 is still parallel to the optical axis D2 of the lens 12 and a rotating axis D4 of the second adjusting member 140b is perpendicular to the optical axis D2 of the lens 12.

In this embodiment, a user may rotate the head portion 1414 of the second adjusting member 140b in the direction of the double-headed arrow A3. When the head portion 1414 of the second adjusting member 140b rotates with respect to the casing 10 in the direction of the double-headed arrow A3, the gear portion 1408 of the second adjusting member 140b drives the rack portion 1406 of the first adjusting member 140a to move in the direction of the double-headed arrow A1, such that the first adjusting member 140a moves with respect to the casing 10 in the direction of the double-headed arrow A1. When the first adjusting member 140a moves with respect to the casing 10 in the direction of the double-headed arrow A1, the side wall of the slot 1402 drives the rod member 142 to move, such that the rod member 142 drives the focus ring 120 to rotate in the direction of the double-headed arrow A2, so as to adjust the focal length of the lens 12.

As mentioned in the above, the invention utilizes the cooperation between the slot of the adjusting module and the rod member to adjust the focus ring of the lens. When a user operates the adjusting module to move with respect to the casing, the side wall of the slot drives the rod member to move, such that the rod member drives the focus ring to rotate. The operation of the adjusting mechanism of the invention is convenient and the structure thereof is simple.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An imaging device comprising:
   a casing comprising a support frame, the supporting frame comprising a sliding groove;
   a lens disposed in the casing, the lens comprising a focus ring; and
   an adjusting mechanism comprising:
      an adjusting module movably disposed on the casing, the adjusting module comprising:
         a first adjusting member movably disposed on the casing, the first adjusting member comprising a slot, a rack portion and an engaging portion, the engaging portion being inserted into the sliding groove to engage with the support frame, and the engaging portion moving with the sliding groove when the first adjusting member moves with respect to the support frame; and
         a second adjusting member rotatably disposed on the casing, the second adjusting member comprising a gear portion, the gear portion meshing with the rack portion, and when the second adjusting member rotates with respect to the casing, the gear portion driving the rack portion to move, such that the first adjusting member moves with respect to the casing; and
      a rod member disposed on the focus ring, the rod member being located in the slot;
   wherein when the adjusting module moves with respect to the casing, a side wall of the slot drives the rod member to move, such that the rod member drives the focus ring to rotate.

2. The imaging device of claim 1, wherein a rotating axis of the second adjusting member is parallel or perpendicular to an optical axis of the lens.

3. The imaging device of claim 1, wherein the second adjusting member further comprises a head portion, a neck portion, a restraining portion and an end portion, the end portion has an engaging recess, the adjusting module further comprises a retaining member and a fixing member, the fixing member fixes the head portion to the neck portion, and the retaining member engages with the engaging recess, such that the support frame is sandwiched in between the restraining portion and the retaining member.

4. The imaging device of claim 1, wherein the second adjusting member further comprises a rotating portion and a pivot, the second adjusting member is pivotally connected to the support frame by the pivot, the gear portion is disposed on the rotating portion, and the rotating portion is exposed from the casing.

5. The imaging device of claim 1, wherein an axial direction of the rod member is parallel to an optical axis of the lens.

6. The imaging device of claim 1, wherein the focus ring comprises a protruding portion and the rod member extends from the protruding portion.

7. An imaging device comprising:
   a casing comprising a support frame;
   a lens disposed in the casing, the lens comprising a focus ring; and
   an adjusting mechanism comprising:
      an adjusting module movably disposed on the casing, the adjusting module comprising:
         a first adjusting member movably disposed on the casing, the first adjusting member comprising a slot and a rack portion;
         a second adjusting member rotatably disposed on the casing, the second adjusting member comprising a gear portion, a head portion, a neck portion, a restraining portion and an end portion, the end portion having an engaging recess, the gear portion meshing with the rack portion, and when the second adjusting member rotates with respect to the casing, the gear portion driving the rack portion to move, such that the first adjusting member moves with respect to the casing;
         a fixing member fixing the head portion to the neck portion; and
         a retaining member engaging with the engaging recess, such that the support frame is sandwiched in between the restraining portion and the retaining member; and
      a rod member disposed on the focus ring, the rod member being located in the slot;
   wherein when the adjusting module moves with respect to the casing, a side wall of the slot drives the rod member to move, such that the rod member drives the focus ring to rotate.

8. The imaging device of claim 7, wherein a rotating axis of the second adjusting member is perpendicular to an optical axis of the lens.

9. The imaging device of claim 7, wherein an axial direction of the rod member is parallel to an optical axis of the lens.

10. The imaging device of claim 7, wherein the focus ring comprises a protruding portion and the rod member extends from the protruding portion.

11. An imaging device comprising:
a casing comprising a support frame;
a lens disposed in the casing, the lens comprising a focus ring; and
an adjusting mechanism comprising:
an adjusting module movably disposed on the casing, the adjusting module comprising:
a first adjusting member movably disposed on the casing, the first adjusting member comprising a slot and a rack portion; and
a second adjusting member rotatably disposed on the casing, the second adjusting member comprising a gear portion, a rotating portion and a pivot, the second adjusting member being pivotally connected to the support frame by the pivot, the gear portion being disposed on the rotating portion, the rotating portion being exposed from the casing, the gear portion meshing with the rack portion, and when the second adjusting member rotates with respect to the casing, the gear portion driving the rack portion to move, such that the first adjusting member moves with respect to the casing; and
a rod member disposed on the focus ring, the rod member being located in the slot;
wherein when the adjusting module moves with respect to the casing, a side wall of the slot drives the rod member to move, such that the rod member drives the focus ring to rotate.

12. The imaging device of claim 11, wherein a rotating axis of the second adjusting member is parallel to an optical axis of the lens.

13. The imaging device of claim 11, wherein an axial direction of the rod member is parallel to an optical axis of the lens.

14. The imaging device of claim 11, wherein the focus ring comprises a protruding portion and the rod member extends from the protruding portion.

* * * * *